United States Patent
Shoemake et al.

(10) Patent No.: US 8,806,202 B2
(45) Date of Patent: Aug. 12, 2014

(54) POSITION BASED ENHANCED SECURITY OF WIRELESS COMMUNICATIONS

(75) Inventors: Matthew Brendan Shoemake, Allen, TX (US); Sidney Brower Schrum, Jr., Fairview, TX (US); John M. Hughes, Lakeway, TX (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 12/467,917

(22) Filed: May 18, 2009

(65) Prior Publication Data

US 2009/0240940 A1    Sep. 24, 2009

Related U.S. Application Data

(62) Division of application No. 11/108,410, filed on Apr. 18, 2005.

(60) Provisional application No. 60/562,947, filed on Apr. 16, 2004.

(51) Int. Cl.
*H04L 29/06* (2006.01)
*H04W 12/12* (2009.01)
*H04W 12/00* (2009.01)

(52) U.S. Cl.
CPC .............. *H04W 12/12* (2013.01); *H04W 12/00* (2013.01)
USPC ....................................................... 713/168

(58) Field of Classification Search
USPC ....................................................... 713/168
See application file for complete search history.

(56) References Cited

U.S. PATENT DOCUMENTS

| | | | |
|---|---|---|---|
| 5,844,900 A | 12/1998 | Hong et al. | |
| 6,119,013 A * | 9/2000 | Maloney et al. | 455/456.2 |
| 6,329,948 B1 * | 12/2001 | Ishikawa | 342/457 |
| 7,318,111 B2 | 1/2008 | Zhao | |
| 7,342,906 B1 * | 3/2008 | Calhoun | 370/338 |
| 8,208,634 B2 | 6/2012 | Hughes et al. | |
| 2002/0123325 A1 * | 9/2002 | Cooper | 455/411 |
| 2002/0196764 A1 | 12/2002 | Shimizu | |
| 2003/0054846 A1 * | 3/2003 | Parry | 455/517 |
| 2003/0064718 A1 | 4/2003 | Haines et al. | |
| 2003/0087602 A1 | 5/2003 | Kammer | |
| 2003/0232598 A1 * | 12/2003 | Aljadeff et al. | 455/41.2 |
| 2003/0235164 A1 * | 12/2003 | Rogers et al. | 370/331 |
| 2004/0190718 A1 * | 9/2004 | Dacosta | 380/247 |
| 2005/0003832 A1 | 1/2005 | Osafune et al. | |
| 2005/0021725 A1 * | 1/2005 | Lobbert | 709/223 |
| 2005/0117750 A1 * | 6/2005 | Rekimoto | 380/247 |

FOREIGN PATENT DOCUMENTS

GB          2342010 A  *  3/2000  ............. H04B 7/005

* cited by examiner

*Primary Examiner* — Jason Gee
(74) *Attorney, Agent, or Firm* — Nicholas J. Pauley; Peter Michael Kamarchik; Joseph Agusta

(57) ABSTRACT

The convenience of a wireless network is tempered by the concern that a rogue device can listen in on the wireless communications. Determining the position of the home device and other devices within range allows the user of the home device to choose the specific wireless devices with which to communicate. The distance to the other devices within wireless communications range is helpful and allows the user to sort between safe and unsafe or rogue devices. Distance can be determined by a variety of methods including use of trusted references, signal strength, and error rate. Once the safe device is selected, the system will then establish a communications path with that device.

13 Claims, 5 Drawing Sheets

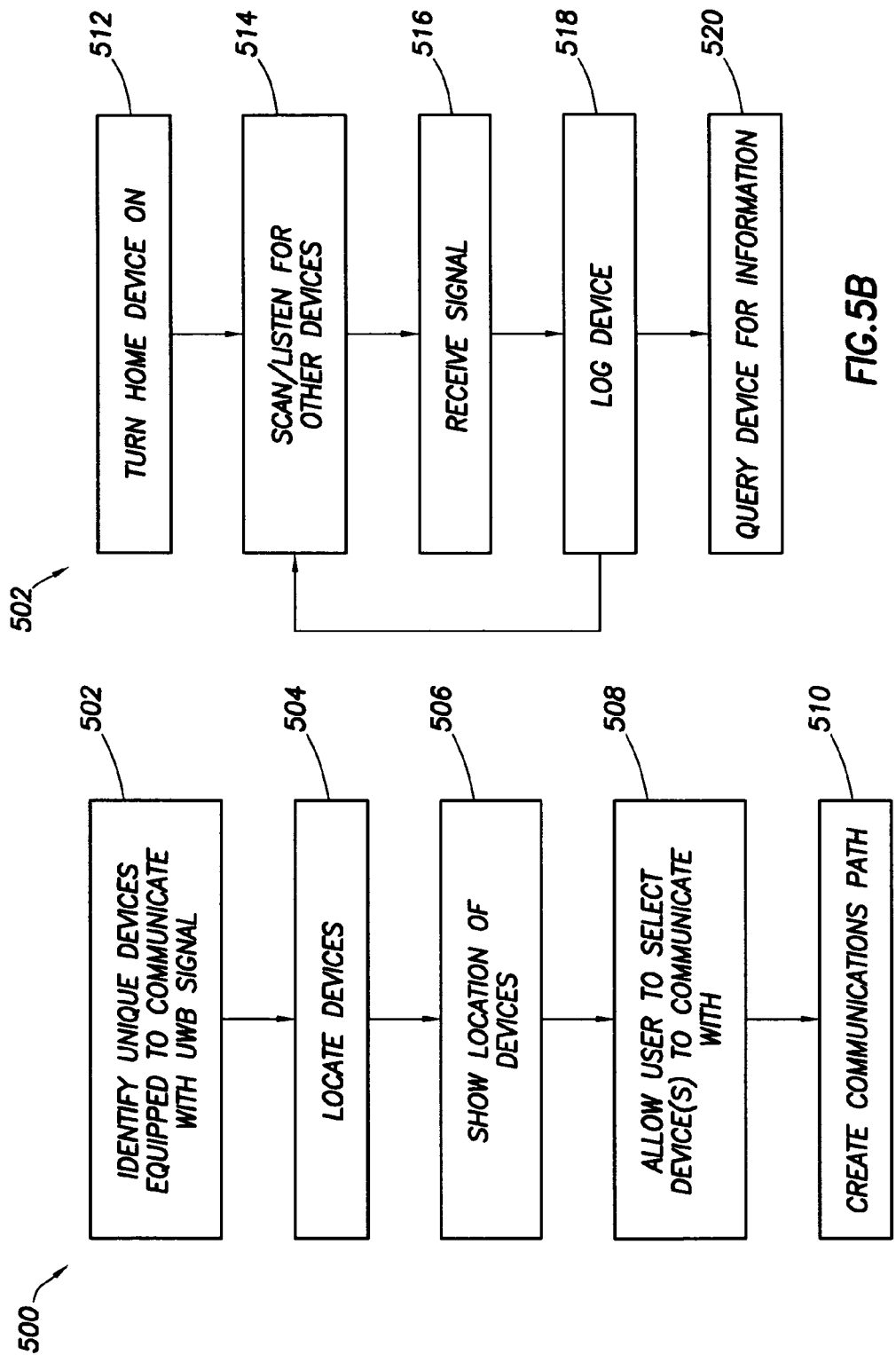

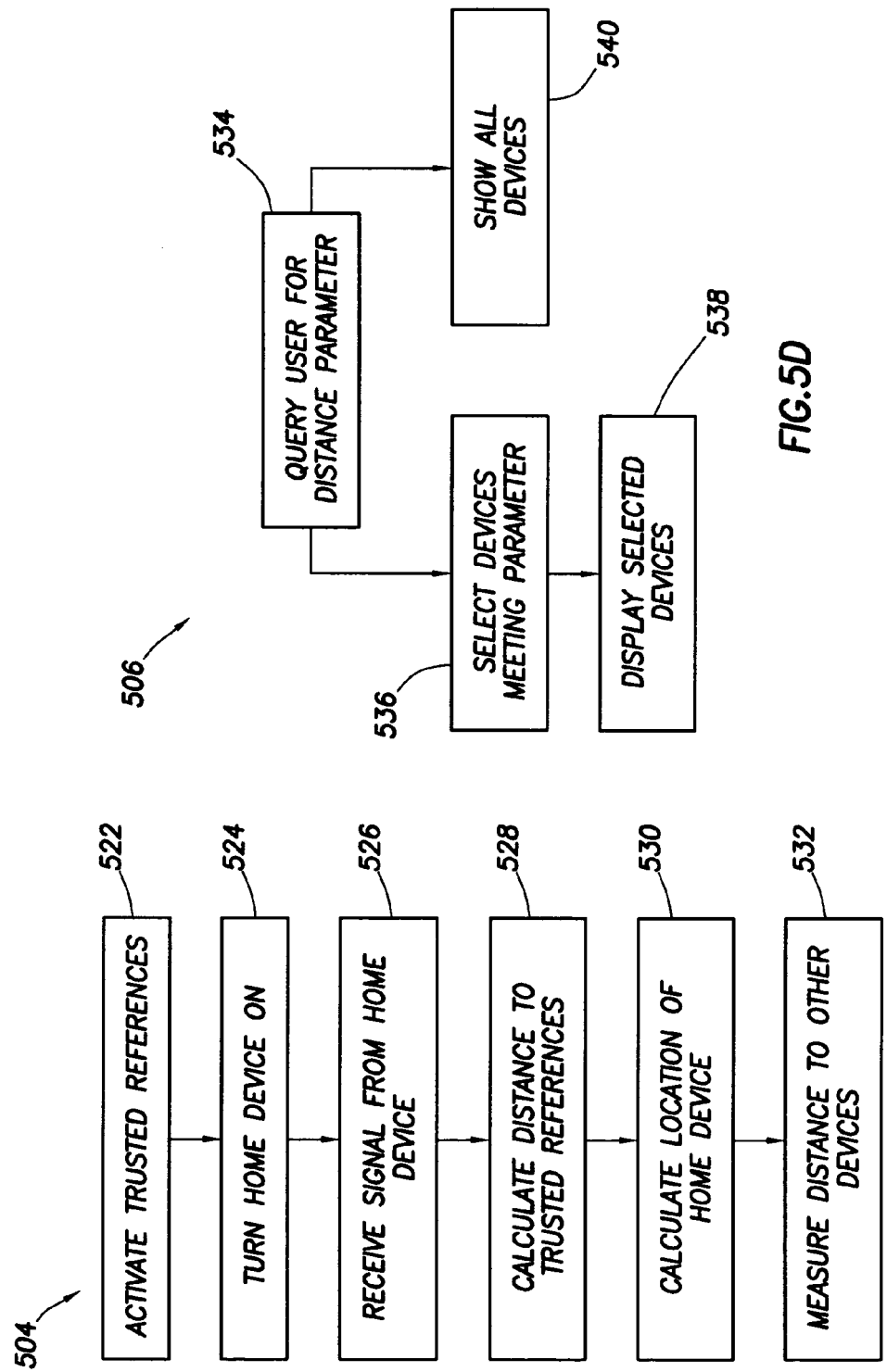

POSITION BASED ENHANCED SECURITY OF WIRELESS COMMUNICATIONS

CLAIM OF PRIORITY UNDER 35 U.S.C. §120

The present Application for Patent is a divisional of patent application Ser. No. 11/108,410 entitled "POSITION BASED ENHANCED SECURITY OF WIRELESS COMMUNICATIONS", filed Apr. 18, 2005, pending, which claims priority to Provisional Application No. 60/562,947 entitled "POSITION BASED ENHANCED SECURITY OF WIRELESS COMMUNICATIONS" filed Apr. 16, 2004, and assigned to the assignee hereof and hereby expressly incorporated by reference herein.

BACKGROUND

1. Field

The present invention relates to a system for enhancing the security of wireless communications by understanding the position of other wireless devices in the proximity of the transmitting device. The user is provided with a list populated based on criteria such as device type or distance from the transmitting device.

2. Background

For many communications applications, it is important that the communications system offer secure transport of messages. Information content is often sensitive and therefore must be protected from unintended "eaves dropping" and subsequent unauthorized use.

Preventing the unwanted use of transmissions represents a special challenge for wireless communications systems. Potentially, any wireless communications device can intercept and decode the wireless transmissions of any other device that is within range, and it is extremely difficult to detect unintended reception. In addition, determining if a station is a legitimate participant of a wireless network is not always straightforward. For example, a wireless transmission within an office might be received by a competitor sitting in a parking lot adjacent to the office.

Therefore, it is desirable if not essential that wireless communication systems implement security protection mechanisms. When considering such mechanisms, it is both desirable to maximize the level of protection while at the same time minimize potential negative impacts, such as increased cost and complexity of the devices, decreased throughput, and inconvenience to the user. Multiple mechanisms may be used in concert to provide improved levels of protection.

Various mechanisms have been used to protect wireless networks. In some cases, protection mechanisms are not implemented due to the cost incurred and inconvenience to the user because of the need to configure the system with encryption keys or other information used to authenticate devices.

Some wireless communication systems utilize identifiers which must be supplied by devices desiring to participate in a network. Specialized network coordinating "base station" devices authenticate requesting devices based on reception of the correct identifier. Such systems are simple to implement but provide weak protection because the identifier when transmitted to the "base station" is not protected and can therefore be easily intercepted.

Other wireless systems utilize secret encryption key(s). Keys are not transmitted over the wireless network. Instead, devices demonstrate knowledge of the key(s) by encrypting test messages. Coordinating base stations receiving a correctly encrypted test message authenticate the device transmitting the message. Such systems when correctly designed provide strong protection, but are relatively complex.

Some wireless communications systems utilize encryption keys together with mechanisms to securely distribute security keys. Such systems can provide robust protection with minimum configuration by the user. Various encryption key manipulating algorithms have also been implemented to make it more difficult to determine the key or the encryption sequence generated from the key.

A need exists for a method of improving the security of a wireless transmission. Such a method should provide a user with the ability to determine the approximate distance to the devices capable of receiving the transmission. Then the system should provide the user with the ability to select the devices to communicate with before any communications path is established.

SUMMARY

The present invention seeks to reduce the risk of a rogue device eaves dropping on a wireless device as it transmits to a trusted device. This requires the location of any device capable of receiving a signal be determined. The transmitting device is also known as the home device. Its location can be determined relative to certain trusted references. The use of at least three trusted references provides this location. The location of the other devices can be similarly determined. The user is then prompted for a distance criteria. If he provides one, only those devices meeting that criteria are eligible for establishing a communications path with the home device.

Identifying the other unique devices within range of the home device involves listening or scanning for their signals and logging the device if a signal is received. This step also involves querying the device for information. Obtaining the distance to each device involves, in one embodiment, the use of trusted references that estimate distance based on signal strength. With enough trusted references, the distance to each device is determined. This distance, along with the knowledge of where the trusted references are located allows a relatively precise understanding of the distance between the home device and the other devices. The list of other devices can be displayed to the user graphically or with a list. Once the user selects the device or devices to communicate with, a communications path must be established. One method of doing so involves nesting an encryption key on the safe devices. This key is identified and authenticated. If authentication is accomplished, then the address if device is used to create the communications path.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A to 5F provide the methodology of determining the location of a safe device and establishing communications with it.

DETAILED DESCRIPTION

The invention described herein provides enhanced security by using information about the relative location of interoperable wireless communication devices. The invention may be used as a distinct, stand-alone mechanism, or may be used in conjunction with other security mechanisms. The invention may be used for deciding whether to establish a communications path (for example during a "connection establishment", "authentication", and/or "association" procedure), or whether to transfer specific messages, or for other security related purposes.

The invention may be used with networks consisting of fixed location devices, mobile devices, or with networks consisting of fixed and mobile devices. Examples of the types of networks that may be able to make use of the invention include, but are not limited to, wireless telephony ("cell phones"), wireless local area networks, and wireless personal area networks.

Figure 1:
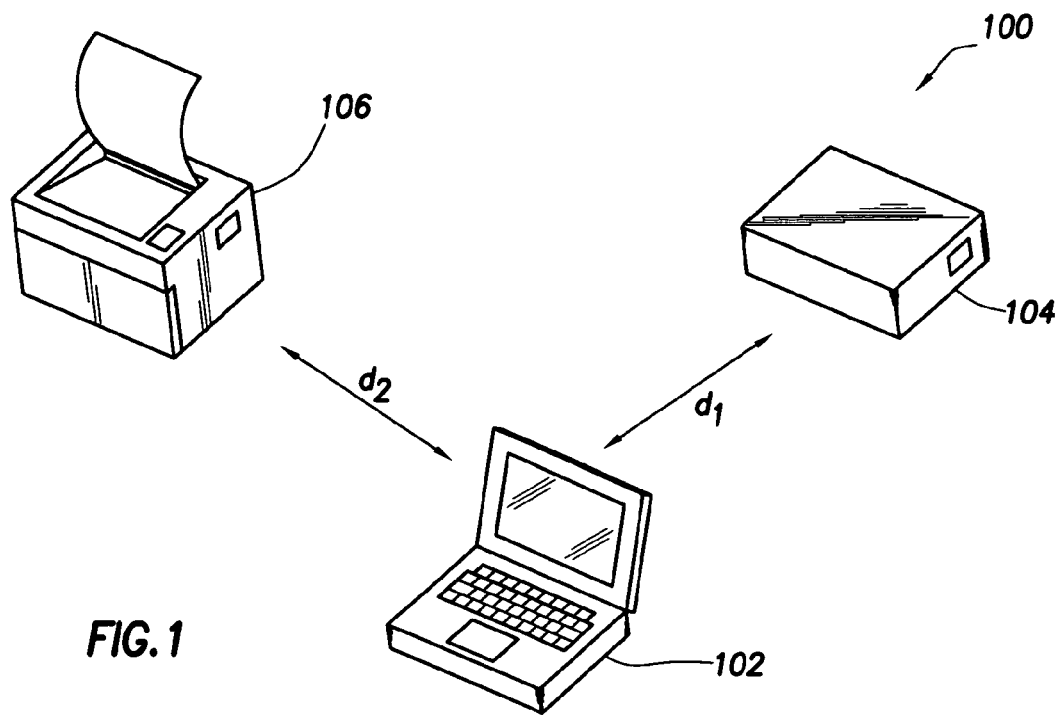
FIG. 1 is a perspective view of a transmitting device determining the distance to a first and second receiving device.

In the simplest embodiment, a wireless communication device permits or prohibits the establishment of communications and/or the transfer of individual messages between itself and a neighboring wireless device based on the estimated distance between the two devices. Typically, but not necessarily, neighboring devices whose distance exceeds some threshold are not allowed to communicate. For example, FIG. 1 provides a simple illustration of a wireless network 100. The network comprises a laptop computer 102, a projector 104 and a printer 106. The user of the laptop may be interested in transmitting to the projector but not risk transmitting to the printer. Therefore it is imperative that the laptop be able to determine the distance and relative locations of the various wireless devices near it. An enhanced embodiment of the invention utilizes the relative position of devices in determining whether to accept or reject attempts by neighboring devices to establish communications and/or transfer individual messages.

Establishing the Criteria for Accepting Communications

A variety of means may be used to establish the criteria for accepting or rejecting communications based on position. For the basic embodiment, the criteria are based on estimated distance between the two devices. For the enhanced embodiment criteria based up relative position are used, including whether or not a neighboring device is estimated to be located within some geographic symmetric or asymmetric area relative to the device accepting or rejecting communications.

In situations where the criteria do not change often, the criteria may be pre-programmed in to the device. Or, the user may enter information into the device to establish the accept/reject criteria. The user may also be prompted to determine if a device should be allowed to communicate, with the distance or relative position and possibly other information provided to the user.

A combination of these methods may be used, together with other criteria, such as whether the neighboring device is able to supply security credentials, or the type of device; establishment of communications and/or a decision to prompt the user for input may be based upon a neighboring device matching some profile which may be quite complex.

Distance Determination

The invention can make use of any suitable mechanism for determining distance, of which there are a number well known in the industry. Devices may for example use receive signal strength measurements or receive bit error rates to determine distance. For these two techniques the device listens to transmissions from neighboring devices and using measurements of certain characteristics of the signal (for example the signal strength or the number or errors detected during decoding of the signal), together with known characteristics of the wireless channel and protocol (i.e. transmit power, etc.), estimates the distance to neighboring devices.

Due to differing attenuation characteristics of materials that make up the wireless medium and due to other factors, a precise determination of distance may not be a available. However, the higher attenuation introduced by walls and other partitions enhances the usability of the invention. In many scenarios, the physical separation implied by the presence of walls is consistent with the users desire to exclude devices from the set that are considered legitimate devices for establishing communications. For example, a user operating a device inside of a building might want to exclude entirely communications with devices outside of the building, and the attenuation introduced by the exterior walls in this case helps distinguish legitimate devices from rogue devices.

The device may also derive the distance to a device based on the propagation delay of messages sent between the devices. Wireless protocols typically support immediate acknowledgement of transmissions, with a short, fixed interval between a message (packet) and the acknowledgement. Therefore round-trip delay can be measured directly and propagation delay calculated from the round-trip delay. Typically the interval between message and acknowledgement is set to the minimum that is supportable with current technology, making it difficult to bypass the security system by "spoofing" the system in such a way that the originating device estimates a distance shorter than actual.

Propagation delay between devices may also be derived by exchanging messages that contain local clock timing information. Multiple message exchanges provide greater accuracy.

A variety of techniques may be used in combination in order to develop a more detailed device profile and thereby provide additional protection from "spoofing". In addition, messages transferred for the purpose of measuring propagation delay may be protected using other security mechanisms, such as encryption.

Position Determination

Determining the relative position of devices may be accomplished through a variety of means. In the case that there are multiple interoperable wireless communications devices within range, relative position may be determined by combining the measurements from the devices. Each device determines the distance to its neighboring devices, and then makes this information available to neighboring devices within range, or devices that are not within range but are reachable through wireless "repeaters" or through wired communications. Mesh networking techniques, which may be used to reach nearby devices that are out of range, are well known in the industry. Other means such as the use of directional antennas together with signal quality indicators may be used to enhance position determination.

Trusted Fixed Position References

The invention may also make use of trusted fixed references to determine absolute location. Using such fixed references allows devices to determine if they are within a geographic region, and therefore whether they should establish communications and/or exchange messages with another device based on its own and/or the other device's absolute location. GPS (Global Positioning System) or other types of location determining systems may be used to establish absolute location. Fixed position devices whose absolute location is known and that are trusted may also be used by other devices to establish absolute location by combining relative location information with the absolute location of known, trusted fixed position station(s).

Figure 2:
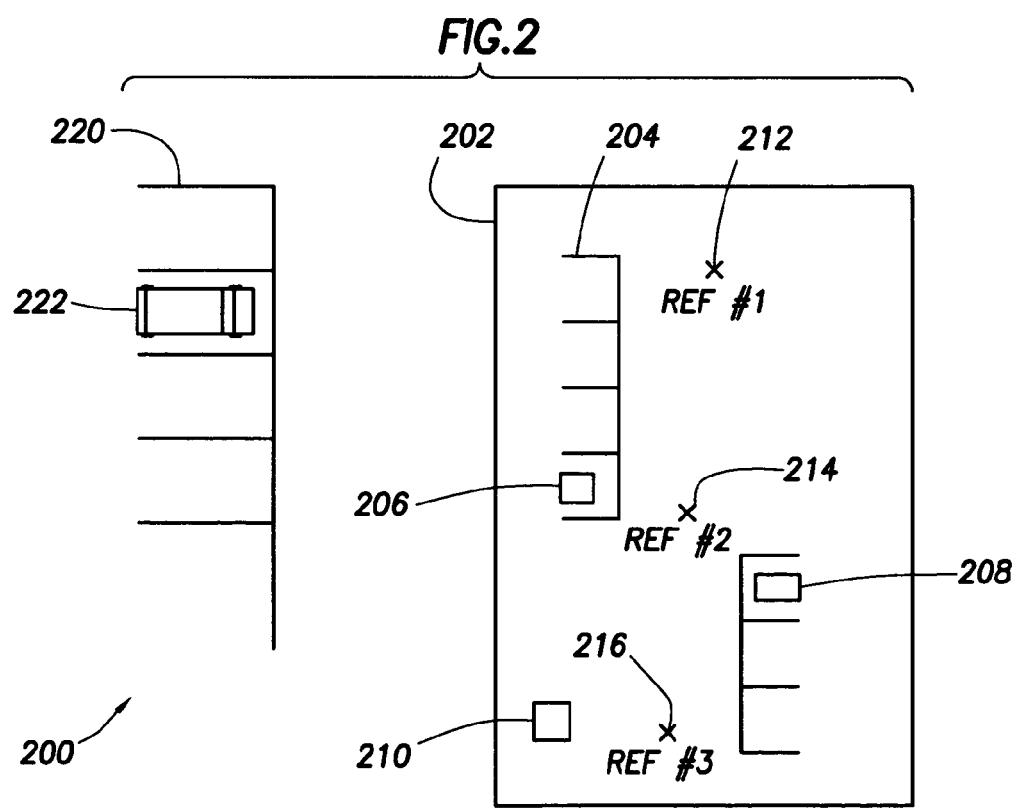
FIG. 2 is a top view illustrating the use of wireless communications within a building and the existence of a rogue device outside the building.

FIG. 2 is an example of the use of a trusted fixed position reference used to identify the location of other wireless devices. A building 200 is depicted having a set of cubicles 204. It is common in many office environments to have cubicles that divide work areas between work groups. In this instance, a first wireless device 206 (such as a laptop computer) is shown in a particular cubicle. If the first device is transmitting the signal, then it will also be referred to as the "home device." A second device 208 is located in another cubicle on the other side of the building, while a third device 210 is shown at one end of the building. In this example, device 208 might be another computer used by another work group. Device 210 might be a network printer. During a workday, it is common for documents to be shared between computers over a wireless network or sent to a printer. The concern is that a rogue device might be located in a vehicle 222 in the parking lot adjacent to the building. The rogue device can receive the same wireless transmissions sent within the office. This is a form of corporate espionage that can cost a company millions of dollars a year. The present invention prevents this eavesdropping by determining the position of devices 208 and 210, and the rogue device 222. These locations are compared to known parameters such as the location of the building boundaries 202.

Figure 4:
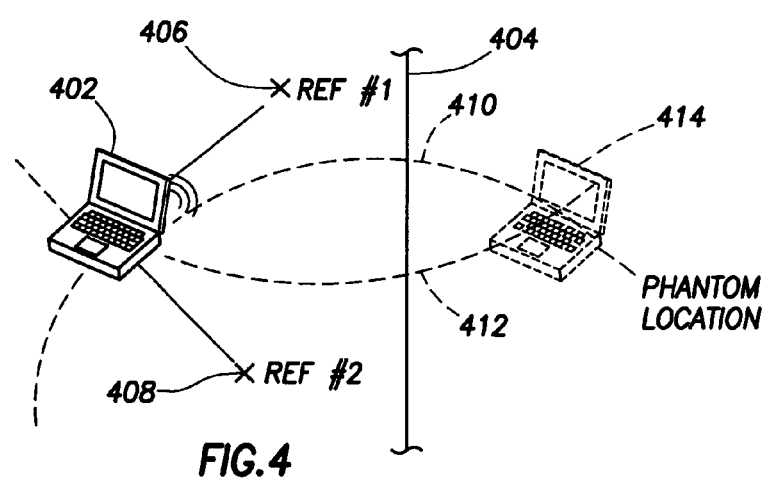
FIG. 4 illustrates the use of at least two reference points to determine the location of a device.

The locations of the devices can be determined relative to known reference points 212, 214, and 216. Using the techniques discussed above, device 206 will be able to determine its distance from all three references. With that information, its position can be determined by triangulation. For example, if the distance to reference 212 is thirty feet, a circle can be drawn around reference 212 having a thirty-foot radius. The device 206 will be located somewhere on that circle. If device 212 is located twenty feet from reference 214, a similar circle can be drawn around reference 214. This second circle will intersect the first circle at two locations. As shown in FIG. 4, this produces two potential locations for the device 206. Next, the distance to reference 216 is determined and a third circle is drawn around that reference. This third circle should intersect the first and second circles at the same location. A straight-forward algorithm then determines an absolute location from these three trusted references. The locations of devices 208 and 210 are determined in the same manner. So is the location of the rogue device that interacts with the network in an attempt to eavesdrop.

With the location of all wireless devices 206, 208, 210, and 222 known, as well as the outer boundary 202, it is possible to create a list of "safe" devices and "unsafe" devices such as rogue device 222.

Figure 3:
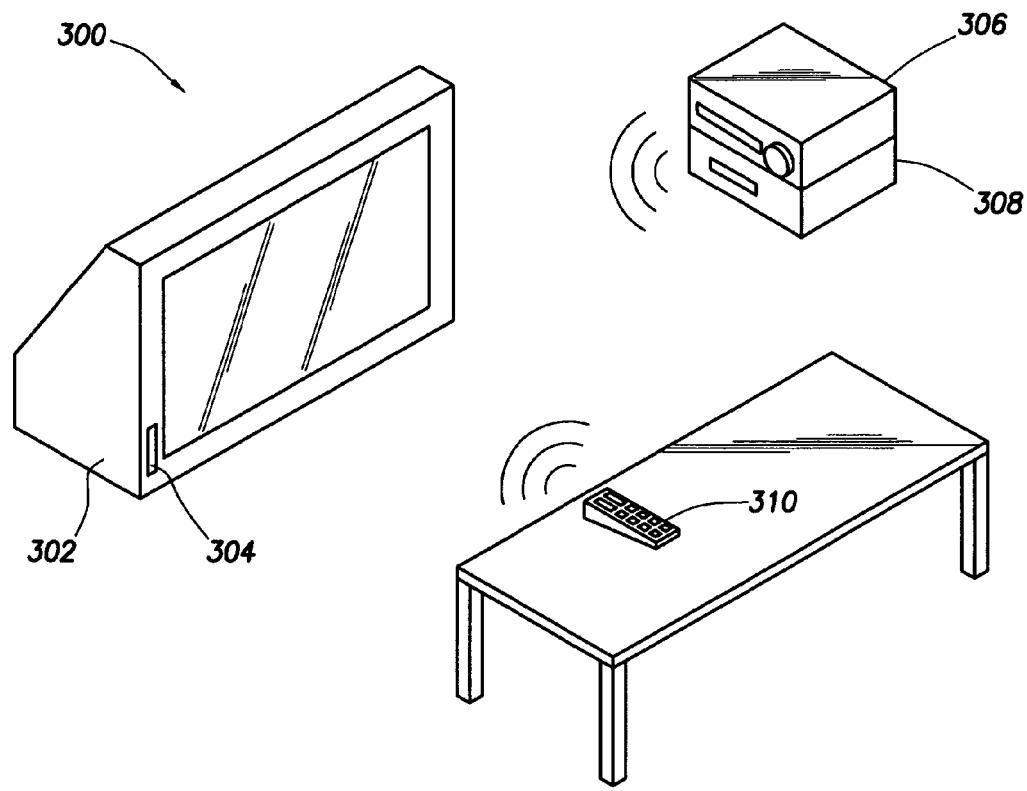
FIG. 3 is a perspective view of a wireless ultra broadband network connecting various audio visual equipment and controls.

While the discussion has focused primarily on computing devices, it is just as useful for other electronic devices that communicate with each other. FIG. 3 illustrates the use of a wireless network 300 in a home theatre. A television 302 is used in conjunction with a receiver 306 and a DVD player 308. These are in turn controlled by a remote control 310. With the advent of ultra wideband wireless communications, no wired connections are needed for the content signal from the DVD player to be received by the television. The television will still need to differentiate between the wireless devices in the particular room or home and those of, for example, a neighbor's. In this instance, a trusted reference 304 may be located on the television itself. Based on signal strength or error rate or another scheme, the distance is determined for the devices 306, 308 and 310. Less than three reference points may be used in this situation if the assumption is made that the "safe" devices are located in front of the television.

FIG. 4 illustrates the dilemma of relying on less than three points to locate a device. In this illustration, the distance between the device 402 and a first reference 406 and a second reference 408 is measured. This leads to two possible positions, including the phantom location 414. However, with the knowledge of certain boundaries such as wall 404, the second location can be ignored.

FIG. 5A shows the top level method 500 used in the present invention. The first step 502 is to identify unique devices equipped to communicate with the home device. This might involve use of ultra wideband (UWB) wireless communications. This will include both the safe and unsafe devices within the range of the wireless network. These devices are then located 504 using the methods discussed above. The user is then shown 506 a list of or the location of the safe and unsafe devices. The user can be allowed to select 508 the devices with which to communicate. A communications path is then created 510 between the two devices.

FIG. 5B provides more detail on step 502, namely identifying all devices within range of the home device that are capable of communicating with it. The home device must be turned on 512. Next it must scan 514 or listen for other devices. If it receives a signal 516 from a device, it will create a log of that device 518. The signal received might be part of a handshake protocol or other interrogation signal. Once received, the home device queries the device for additional information. For example, it might obtain information on the type of device that is part of the network, i.e. a printer or a projector. The home device will also continue to loop back to listening for other devices.

The flow chart of locating the unique devices is provided in FIG. 5C. The trusted references 522 are activated. The position of these references may be entered manually, or the references might have some other location technology embedded such as GPS. The home device is also active 524. As signal is received by the home device 526, the distance to the trusted references can be calculated 526. This allows the location of the home device to be determined 530. The same method is used by the other devices to determine their locations 532.

With the locations of all devices known and logged, the user is queried for a distance parameter 534 as shown in FIG. 5D. This is the first step in segmenting the safe and unsafe devices 506. If the user provides a distance parameter, the devices meeting that parameter will be sorted into a first list 536. A user will likely know a rough estimation of an acceptable distance. For example, if a user is making a presentation in a conference room and wants to communicate between his laptop and a projector, he will have an innate understanding of that distance, say five feet. He might choose a ten foot parameter. This would allow him to see only those devices within ten feet. Tighter distance criteria results in a smaller the list of acceptable devices. If the user does not provide distance criteria, then all devices might be selectable. However, it might also be helpful to see if any devices are listed that are unknown to the user. Alternatively, the acceptable distance criteria might default to the previously entered value. Another alternative is to distinguish the acceptable devices based on another criteria such as whether the other wireless device is moving or stationery.

Figure 5E:
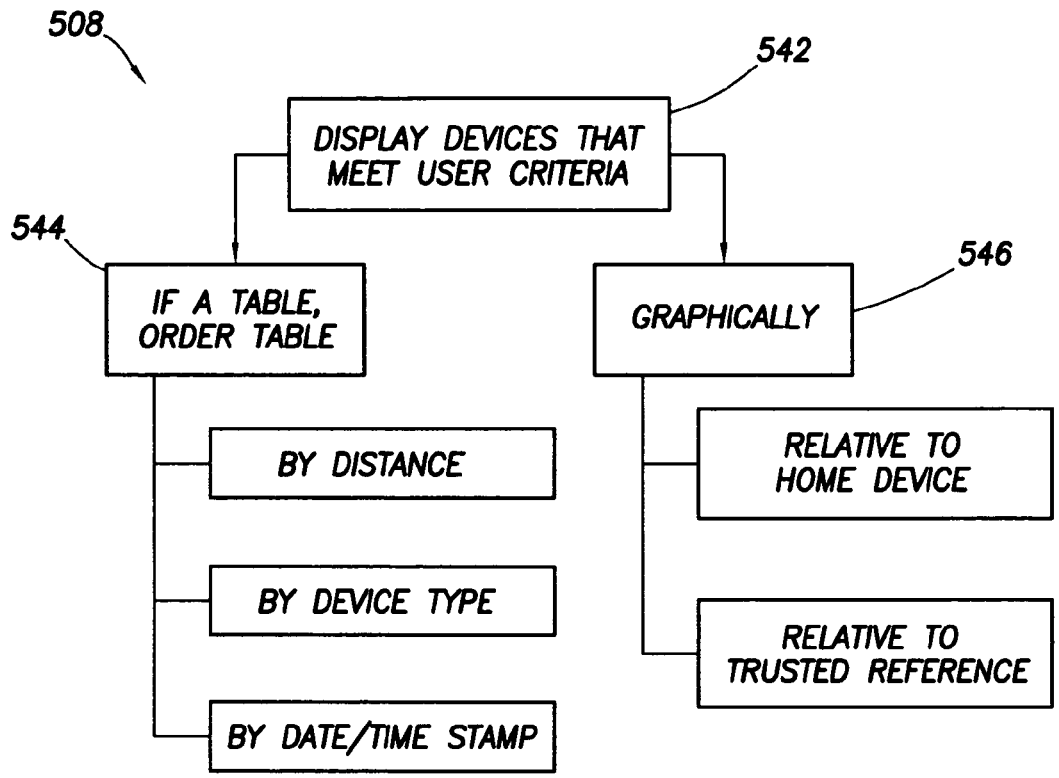
Figure 5F:
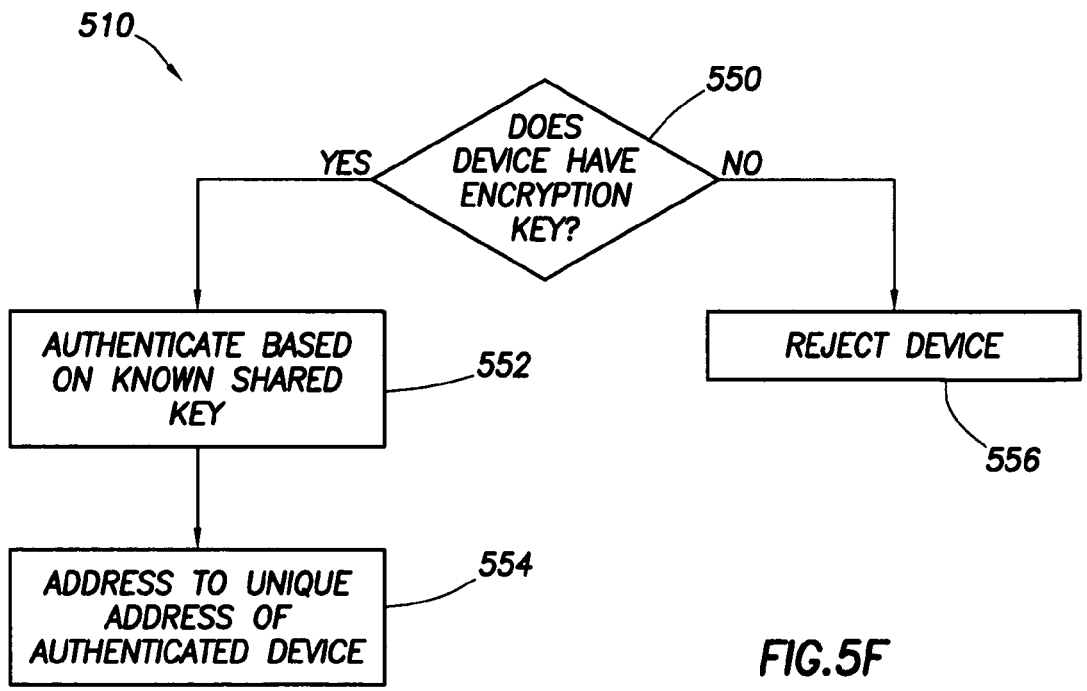

In a dense office environment, it might also be helpful to sort the list of devices as shown in FIG. 5E. That display will include the devices that meet the user's criteria 542. If the devices are shown as a table, then the table can be ordered 544. The order could be by distance, by device type or by a date/time stamp. For example, the top of the list might be the devices between zero and five feet from the home device. It should be noted that the distance can be in any direction including vertical and horizontal planes. Alternatively, the devices could be sorted by type. For example, all printers could be listed first, followed by other laptops or desktops. Alternatively, the time at which the device was identified could be used as sort criteria. The latest device could be listed first. Another alternative would be an alphabetical listing based on a device name provided by the user.

Other methods of sorting the data also fall within the scope and intent of this invention. For example, devices could be sorted according to whether they are moving or stationery. The location of the devices could also be shown graphically 546, relative to the home device or relative to the trusted references. The graphical display could be prompted by the user.

A device can determine which other devices to connect to based on the distance of the other devices. This helps a device only connect to devices that may be inside a cube for example. Users of a device may or may not be prompted to connect to another device based on its distance. This is a user feature that keeps the user from being annoyed with multiple devices popping up on the screen all the time. Users may or may not be prompted to connect to a device based on whether or not the device is moving or stationary. Again, this is a convenience feature for filtering out devices that may be walking by a cube or down a hall. As a modification, the user may or may not be prompted depending on if the device is coming closer or moving away. A device may or may not connect to another device based on absolute location that is established via other fixed references. This allows the user to not connect to something that may be on the other side of a wall. Note that the fixed references could be other UWB devices or could be non-UWB devices, e.g. through GPS.

Finally a communications path must be established with the selected device. One method would be to see if the device has an encryption key 550. If not, then the device should be rejected 556. If it does have an encryption key, it should be authenticated based on a known shared key 552. Once the key is authenticated, the transmission can be addressed to the unique address of the authenticated device 554. In one embodiment, key exchange may only be done with devices inside a small distance. As a modification, the device may turn down its transmit power to limit the distance that its signal can be detected by others to help avoid any spoofing.

While various embodiments of the invention have been described, it will be apparent to those of ordinary skill in the art that many more embodiments and implementations are possible within the scope of the invention. Accordingly, the invention is not to be restricted except in light of the attached claims and their equivalents

What is claimed is:

1. A method comprising:
   scanning for transmissions of signals from a wireless device;
   identifying a position attribute for the wireless device based on characteristics of the signals;
   determining whether the wireless device is located beyond a fixed boundary based at least in part on the position attribute prior to a communication path being established with the wireless device;
   if it is determined that the wireless device is not located beyond the fixed boundary, determining a time at which the wireless device was identified and assigning a place in an ordered list to the wireless device based on the time at which the wireless device was identified;
   displaying the ordered list to a user; and
   prompting the user to select whether a communication path to the wireless device must be established or not, based on the display.

2. The method of claim 1, further comprising calculating a distance to the wireless device.

3. The method of claim 1, further comprising identifying if the wireless device is in motion.

4. The method of claim 3, further comprising prompting the user to select the wireless device in response to identifying that the wireless device is in motion.

5. The method of claim 1, further comprising reducing a transmission power in response to the selection of the wireless device.

6. The method of claim 1, wherein the characteristics of a signal includes at least one of a strength of the signal, number of errors detected during decoding of the signal, or transmit power of the signal.

7. The method of claim 1, wherein the scanning for transmissions is performed prior to receiving any requests for access from the wireless device.

8. An apparatus comprising:
   a transceiver to scan for transmissions of signals from a wireless device;
   a processor coupled to the transceiver, the processor adapted to:
      identify a position attribute associated with the wireless device based on characteristics of the signals;
      determine whether the wireless device is located beyond a fixed boundary based at least in part on the position attribute prior to a communication path being established with the wireless device;
      if it is determined that the wireless device is not located beyond the fixed boundary, determine a time at which the wireless device was identified and assign a place in an ordered list to the wireless device based on the time at which the wireless device was identified;
   a display to display the ordered list to a user; and
   a user interface to prompt the user to select whether a communication path to the wireless device must be established or not, based on the display.

9. The apparatus of claim 8, wherein the fixed boundary includes a building boundary.

10. The apparatus of claim 9, wherein the processor is further adapted to prompt the user to select the wireless device in response to determining that the wireless device is in motion.

11. A non-transitory computer-readable medium comprising instructions that, when executed by a processor, cause the processor to:
- scan for transmissions of signals from a wireless device;
- identify a position attribute associated with the wireless device based on characteristics of the signals;
- determine whether the wireless device is located beyond a fixed boundary based at least in part on the position attribute prior to a communication path being established with the wireless device;
- if it is determined that the wireless device is not located beyond the fixed boundary, determine a time at which the wireless device was identified and assign a place in an ordered list to the wireless device based on the time at which the wireless device was identified;
- provide the ordered list to a user; and
- prompt the user to select whether a communication path to the wireless device must be established or not, based on the classification.

12. An apparatus comprising:
- means for scanning for transmissions of signals from a wireless device;
- means for identifying a position attribute associated with the wireless device based on characteristics of the signals;
- means for determining whether the wireless device is located beyond a fixed boundary based at least in part on the position attribute prior to a communication path being established with the wireless device;
- if it is determined that the wireless device is not located beyond the fixed boundary, means for determining a time at which the wireless device was identified and means for assigning a place in an ordered list to the wireless device based on the time at which the wireless device was identified;
- means for displaying the ordered list to a user; and
- means for prompting the user to select whether a communication path to the wireless device must be established or not, based on the display.

13. A laptop computer comprising:
- a transceiver to scan for transmissions of signals from a wireless device;
- a processor coupled to the transceiver, the processor adapted to:
  - identify a position attribute associated with the wireless device based on characteristics of the signals;
  - determine whether the wireless device is located beyond a fixed boundary based at least in part on the position attribute prior to establishing a communication path with the wireless device;
  - if it is determined that the wireless device is not located beyond the fixed boundary, determine a time at which the wireless device was identified and assign a place in an ordered list to the wireless device based on the time at which the wireless device was identified;
- a display to display the ordered list to a user; and
- a user interface coupled to the processor to prompt the user to select whether a communication path to the wireless device must be established or not, based on the display.

* * * * *